UNITED STATES PATENT OFFICE.

MICHAEL CALLAHAN, OF PITTSFIELD, MASSACHUSETTS, ASSIGNOR TO GENERAL ELECTRIC COMPANY, A CORPORATION OF NEW YORK.

RESINOUS COMPOSITION AND PROCESS OF MAKING THE SAME.

1,091,732.  Specification of Letters Patent.  Patented Mar. 31, 1914.

No Drawing.  Application filed May 1, 1912. Serial No. 694,350.

*To all whom it may concern:*

Be it known that I, MICHAEL CALLAHAN, a citizen of the United States, residing at Pittsfield, county of Berkshire, State of Massachusetts, have invented new and useful Improvements in Resinous Compositions and the Process of Making the Same, of which the following is a specification.

The present invention relates to artificial resinous, gummy or plastic compositions usually known as "condensation products" and suitable for various purposes in the arts such as molded materials, insulations, varnishes, and the like.

In accordance with my present invention I have produced novel condensation products of great elasticity and tenacity. These products although suitable for a wide variety of uses are particularly valuable for electrical purposes because of their high insulating value, as well as their superior mechanical properties.

The novel features of my invention are pointed out with particularity in the claims.

It has been suggested to make a plastic composition by causing one part of glycerin to act upon one part of a polybasic acid, such as succinic acid, under the influence of heat but in this case the resulting compound is a soft and sticky material unsuitable for most technical purposes. I have discovered that when the amount of acid constituent is increased, in some cases doubled, and especially when some of the polybasic aliphatic acid is replaced by a polybasic acid or its anhydrid of the aromatic series, such as phthalic anhydrid, an exceedingly strong, tough and flexible product results.

In carrying out my invention a mixture of a polybasic acid of the aliphatic series such as succinic acid, tartaric acid, pyrotartaric acid, citric acid with polyacid alcohol, such as glycerin or glycol, the acid being in excess of equal proportions, is heated to an elevated temperature until the mixture becomes viscous. When using succinic acid, I prefer to use two parts, by weight, of the acid to one of glycerin; in the case of citric acid I find one and one-half parts, by weight, of acid to one of glycerin to be preferable. A greater proportion forms a product which is too hard. The time of heating and temperature vary with the quantity of material used. For example, for a small sample of 75 grams the time may be as short as ten to fifteen minutes, the time usually increasing with an increase in the quantity of reacting materials, so that with nine kilograms three hours are required. When working with succinic acid the temperature should be nearly 220° C. Citric acid requires a temperature of about 160° C. Heating is accompanied by the evolution of water and the thickening and chemical condensation of the reaction product. The reaction takes place in two stages, first, the formation of a fusible, soluble product, and secondly, the transformation or polymerization of this product to an infusible, insoluble state. The completion of the first reaction can be ascertained by taking out a small sample, and allowing it to cool. If the cooled product is viscous or tenacious but not sticky, the reaction has gone far enough. At this stage the product is soluble in acetone, making a clear solution useful as a varnish. It is also soluble in rosin. The resin is saponifiable with alkali to regenerate the glycerin or other polyhydric alcohol with the formation of a succinate of the alkali.

In some cases it is desirable to substitute for part of the polybasic acid of the chain or aliphatic series an acid of the ring or aromatic series, as described and claimed in my copending application, Serial No. 778,116, filed July 19, 1913, as a continuation in part of the present application. Preferably, one part of phthalic anhydrid is substituted for one part of the succinic or other aliphatic acid. The resulting product is exceedingly strong and tenacious but still retains an elasticity characteristic of this class of materials. If desired the second reaction may be caused to take place and the product rendered infusible and insoluble by heating to a moderate temperature, say 85° C. for a considerable length of time. The length of heating will vary with the composition of the material. I have found that in many cases heating to a temperature of 100 85° C. at atmospheric pressure for about fifteen hours is sufficient to accomplish the final reaction. When the final hardening temperature is too high a rapid evolution of vapor results causing the product to be filled with cavities. When overheating is avoided a very homogeneous transparent material is produced which has a high insulating value and is relatively inert chemically.

By impregnating fibrous, or cellular material with the acetone solution of the material in its soluble stage, the material may be impregnated into the pores of a body and then rendered insoluble and infusible *in situ*.

What I claim as new and desire to secure by Letters Patent of the United States, is:—

1. The process of making a resinous condensation product which consists in heating a polyhydric alcohol and succinic acid to a temperature approaching 220° C. until reaction takes place with the evolution of water, continuing the reaction until a viscous product convertible to an insoluble resin has been obtained and then lowering the temperature to discontinue the reaction, the product thus produced being soluble in acetone.

2. The process of making a strong, flexible condensation product which consists in heating one part, by weight, of glycerin with about two parts, by weight, of succinic acid at a temperature of nearly 220° C. until the mass becomes viscous and then continuing the heat treatment at a lower temperature.

3. The process which consists in heating one part of glycerin with at least two parts of succinic acid until reaction takes place with the formation of a solid, fusible product soluble in acetone and convertible by heat to an infusible insoluble state.

4. The process of making a fusible resin, soluble in acetone, and possessing flexibility which consists in heating succinic acid and a polyhydric alcohol, the acid being in excess by weight of the alcohol, to a temperature of about 220° C. until a sample when cooled is tenacious but not sticky, and then lowering the temperature.

5. A tough, elastic resin, comprising the condensation product of succinic acid and polyhydric alcohol, said resin being homogeneous, fusible, soluble in acetone, and convertible by heat to an infusible, insoluble state.

6. A tough, elastic resin, comprising a condensation product saponifiable to yield glycerin and a succinate, said resin being fusible, soluble in acetone and resin, and convertible to an infusible, insoluble resin, having a high insulating value.

In witness whereof, I have hereunto set my hand this 29th day of April 1912.

MICHAEL CALLAHAN.

Witnesses:
A. McK. GIFFORD,
T. C. WOODSIDE.